United States Patent [19]

Ohkawa et al.

[11] Patent Number: 4,996,511

[45] Date of Patent: Feb. 26, 1991

[54] PRESSURE-SENSITIVE RESISTANCE ELEMENT

[75] Inventors: Kazuhiro Ohkawa, Gunma; Taro Yamazaki, Kanagawa, both of Japan

[73] Assignee: Toshiba Silicone Co., Ltd., Tokyo, Japan

[21] Appl. No.: 347,088

[22] Filed: May 4, 1989

[30] Foreign Application Priority Data

May 9, 1988 [JP] Japan .................................. 63-112203

[51] Int. Cl.$^5$ ............................................. H01C 10/10
[52] U.S. Cl. ..................................................... 338/114
[58] Field of Search ............................. 338/114, 99, 71

[56] References Cited

U.S. PATENT DOCUMENTS

| 4,492,949 | 1/1985 | Peterson et al. | 338/114 |
| 4,640,137 | 2/1987 | Trull et al. | 338/114 X |
| 4,746,894 | 5/1988 | Zeldman | 338/114 X |

Primary Examiner—Bruce A. Reynolds
Assistant Examiner—Marvin M. Lateef
Attorney, Agent, or Firm—Sughrue, Mion, Zinn, Macpeak & Seas

[57] ABSTRACT

A pressure-sensitive resistance element comprising a first contact electrode formed on a first electrically insulating base plate, a second contact electrode formed on a second electrically insulating base plate disposed facing the first contact electrode, a first and/or a second pressure-sensitive electrically conductive layer formed on the whole surface of at least one of the first and second contact electrode regions, and a first and/or second pressure-sensitive electrically conduct pattern formed on at least one of the pressure-sensitive electrically conductive layer and the contact electrode having no pressure-sensitive electrically conductive layer thereon.

13 Claims, 8 Drawing Sheets

PRESSURE-SENSITIVE RESISTANCE ELEMENT

FIELD OF THE INVENTION

This invention relates to a pressure-sensitive resistance element, and more particularly to a pressure-sensitive resistance element having a novel structure, showing an electrically insulating property or high electric resistance at no pressure application, and gradually reducing the electric resistance in proportion to the applied pressure and showing a linear and large change of resistance in a wide range of applied pressure at the application of pressure.

BACKGROUND OF THE INVENTION

A pressure-sensitive resistance element the electric resistance of which reduces gradually or linearly in proportion to an applied pressure has been used for various uses as a pressure sensor. The materials showing the above-described characteristics include a pressure-sensitive electrically conductive elastic body (elastomer) composed of a high molecular elastic body such as silicone rubber compounded with electrically conductive particles. For example, JP-A-53-79937 and 54-80350 (the term "JP-A" as used herein means an "unexamined published Japanese patent application") describe that a rubber sheet which is composed of a high molecular elastic body compounded with conglomerated artificial graphite has pressure sensor like characteristics. Also, JP-A-56-108279 describes that a pressure-sensitive resistance element composed of two electrode plates having sandwiched therebetween a pressure-sensitive resistance layer composed of a binder resin (e.g., an acrylic resin) compounded with a molybdenum sulfide powder will change in resistance thereof in inverse proportion to a pressure being applied.

However, these conventional techniques have such disadvantages that in the former case, the applied pressure range capable of giving a pressure sensor like resistance change is narrow and, in the latter case, the changing range of the resistance is narrow.

That is, in the former case the applied pressure range capable of giving a pressure sensor like resistance change is considerably narrow as from about 30 g to about 1 kg only, and the change of the resistance is rather narrow as from 10 kΩ to several hundreds Ω. Also, in the letter case, the element shows pressure sensor like characteristics in a relatively wide pressure range of from 30 g to 8 kg but the change of the resistance is extremely narrow as from about 10 kΩ to 3 kΩ.

SUMMARY OF THE INVENTION

The invention has been made for solving the above-described disadvantages of conventional techniques and the object of this invention is to provide a pressure-sensitive resistance element having a novel structure, showing an electrically insulating property or an electric resistance at no pressure application but gradually reducing the electric resistance in proportion to the applied pressure, and showing a linear and large resistance change in a wide range of applied pressure.

That is, according to the invention, there is provided a pressure-sensitive resistance element comprising a first contact electrode formed on a first electrically insulating base plate, a second electrode formed on a second electrically insulating base plate disposed facing the first contact electrode at an interval with it, a first and/or a second pressure-sensitive electrically conductive layer formed on the whole surface of at least one of the contact electrode regions of the first and second base plates, and a first and/or a second pressure-sensitive electrically conductive pattern formed on at least one of the pressure-sensitive electrically conductive layer and the contact electrode having no pressure-sensitive electrically conductive layer.

DETAILED DESCRIPTION OF THE INVENTION

Figure 1A:
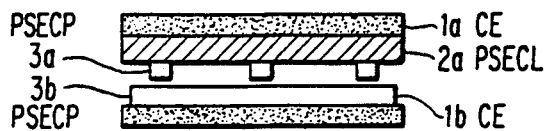
FIG. 1 (A) to (H) each is a schematic sectional view showing each of the pressure-sensitive resistance elements of this invention in Examples (A) to (H), FIG. 2 to FIG. 9 each is a graph showing the change of electric resistance of each of the pressure-sensitive resistance elements of this invention in Examples (A) to (H) with the applied pressure, FIG. 10 (a) to (e) each is a schematic sectional view showing each of the comparison pressure-sensitive resistance elements in Comparison Examples (a) to (e), and FIGS. 11 to 15 each is a graph showing the change of the electric resistance of each of the pressure-sensitive resistance elements in Comparison Examples (a) with (e) to the applied pressure.
Figure 1B:
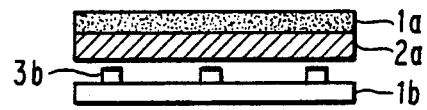
Figure 1C:
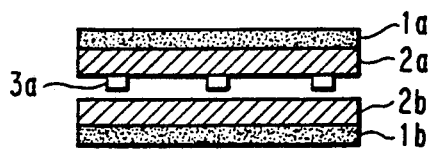
Figure 1D:
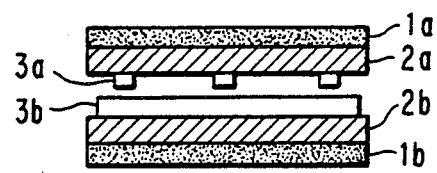
Figure 1E:
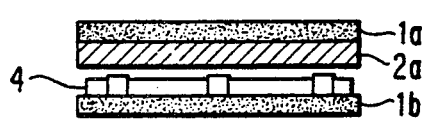
Figure 1F:
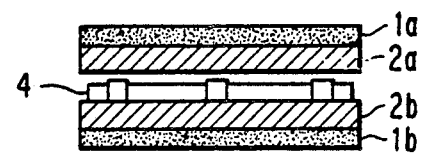
Figure 1G:
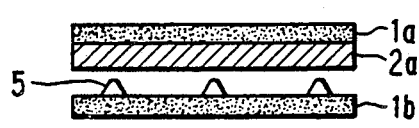
Figure 1H:
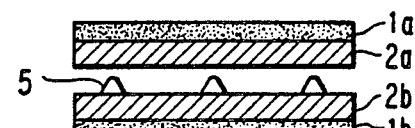

The term "pressure" used herein means a welding pressure, and is hereinafter referred to as a "pressure" for simplicity.

The structural feature of the pressure-sensitive resistance element of this invention is in the combination of the pressure-sensitive electrically conductive layer formed on the whole surface of the contact electrode region and the stripe-form, lattice-form or dot-form pressure-sensitive electrically conductive pattern and the structure is novel.

In a conventional structure of a pressure-sensitive resistance element having only one pressure-sensitive electrically conductive layer on the whole surface of the contact electrode region, the relation between the pressure being applied and the change of resistance with the pressure is almost determined by the composition of the pressure-sensitive electrically conductive layer and hence there is a limit on the pressure-sensitive characteristics. That is, in the conventional structure, a linear resistance range occurs in a narrow pressure range only or the range of the resistance change is narrow. Also, a structure having a combination of a pressure-sensitive electrically conductive layer and an electrically insulating pattern is known but this structure shows the above-described narrow characteristics only.

On the other hand, the pressure-sensitive resistance element of this invention has the following advantages. That is, by the combination of the pressure-sensitive electrically conductive layer and the pressure-sensitive electrically conductive pattern, the linear and wide resistance change characteristics can be kept for each pressure and, further, since the contact areas of the pressure-sensitive electrically conductive layer and the pressure-sensitive electrically conductive pattern change continuously in proportion to the applied pressure, the change of resistance can be attained in a wide pressure range and further the range of the resistance change can be enlarged as compared with the case of a pressure-sensitive electrically conductive layer only.

There is no particular restriction on the electrically insulating base plate (hereinafter referred to as an insulating base plate) for use in this invention if the base plate is an insulating base plate for attaining the object of this invention, but films or sheets of polymers such as, in particular, polyethylene terephthalate capable of easily transmitting an applied pressure to the pressure-sensitive electrically conductive layer and/or the pressure-sensitive electrically conductive pattern is preferably used as the insulating base plate at the side to which a pressure is applied from the standpoints of the handling property and strength.

The contact electrode is formed on the insulating base plate by coating thereon a conventional conductive coating composition or vapor-depositing a metal on the plate.

As a pressure-sensitive electrically conductive material for forming the pressure-sensitive electrically conductive layer and the pressure-sensitive electrically conductive pattern, materials which are generally used for conventional pressure-sensitive resistance elements, such as, for example, an organic polymer matrix compounded with an electrically conductive metal powder or a powder of a semiconductive metal or metal oxide can be used. In particular, the composition obtained by treating the surface of a powder of a metal such as nickel with a platinum compound and dispersing the powder in a polyorganosiloxane (JP-A-59-98164) and the composition obtained by dispersing electrically conductive particles mainly composed of a tin oxide-antimony oxide series oxide in an organic elastic material such as a polyorganosiloxane JP-A-63-215745, both being proposed by the same inventors, are excellent in the points that the change of resistance to an applied pressure is relatively large and the pressure-sensitive electrically conductive pattern having a complicated form such as a stripe, lattice, dot, etc., can be easily formed.

The pressure-sensitive electrically conductive material is coated on the conductive electrode or the pressure-sensitive electrically conductive layer by a screen printing method or a spray coating method, followed by hardening to form a pressure-sensitive electrically conductive layer or a pressure-sensitive electrically conductive pattern.

The pressure-sensitive electrically conductive layer can be formed on the first contact electrode and/or the second contact electrode. There is no particular restriction on the thickness of the pressure-sensitive electrically conductive layer unless the object of this invention is lost, but the thickness is preferably from 5 $\mu$m to 100 $\mu$m from the standpoints of easiness of the coating step, the sensitivity of the pressure-sensitive electrically conductive layer, and the reproducibility of the pressure-sensitive characteristics.

The pressure-sensitive electrically conductive pattern which is formed on the contact electrode and the pressure-sensitive electrically conductive layer or on the two pressure-sensitive electrically conductive layers is necessary for widening the pressure-sensitive resistance range of the pressure-sensitive resistance element of this invention and the form thereof is selected from a stripe form, a lattice form, and a dot form. The pressure-sensitive electrically conductive pattern increases the contact area of the contact electrode and the pressure-sensitive electrically conductive layer facing each other or the two pressure-sensitive electrically conductive layers facing each other in proportion to the pressure applied and hence is necessary for obtaining excellent pressure-sensitive characteristics in a wide pressure range.

When the form of the pressure-sensitive electrically conductive pattern is a stripe or lattice, it is preferred that the line width thereof is from 0.05 mm to 3 mm, the distance between the lines is from 0.1 mm to 50 mm, and the thickness of the pattern is from 5 $\mu$m to 100 $\mu$m. Also, when the form of the pressure-sensitive electrically conductive pattern is a dot, it is preferred that the diameter of the dot is from 0.05 mm to 3 mm, the distance between the dots is from 0.1 mm to 50 mm, and the thickness of the dot is from 5 $\mu$m to 100 $\mu$m. By employing those dimensions, excellent pressure-sensitive characteristics are obtained in a wide range of applied pressure.

Also, when the pressure-sensitive electrically conductive pattern is formed on two surfaces facing each other and the form of the pattern is a lattice or dot, it is necessary for obtaining stable pressure-sensitive characteristics to form the pattern such that the distance between the adjacent lattices or dots is equivalent in the whole lattices or dots. Also, when the form of the pattern formed on the two surfaces is a stripe, it is necessary for the desired purpose that the stripes formed on one surface and the stripes formed on another surface are in a crossing relation with each other at a right angle.

By the combination of the elements as described above according to this invention, a pressure-sensitive resistance element showing excellent change of resistance in a wide range of applied pressure and being useful as a pressure-sensitive sensor is obtained.

The pressure-sensitive resistance element of this invention composed of the combination of the pressure-sensitive electrically conductive layer(s) and the pressure-sensitive electrically conductive pattern(s) described above reduces the electric resistance in proportion to a pressure applied in a wide range of applied pressure, shows a linear and large change of resistance per unit pressure, and hence is useful as a pressure-sensitive sensor for detecting various pressures and pressure changes.

The invention is now further described in detail by referring to the following examples and the comparison examples although the invention is not limited to the examples within the scope of this invention.

In addition, the materials constituting the pressure-sensitive electrically conductive elements in the examples and the comparison examples shown below were as follows but the invention is not limited to these materials.

(1) Insulating Base Plate: Polyethylene terephthalate film of 0.5 mm in thickness.

(2) Contact Electrode: An electrically conductive coating composition composed of an epoxy resin compounded with a silver powder and having a volume resistivity of $10^{-1}$ $\Omega$cm was coated on the insulating base plate at a thickness of 20 $\mu$m.

(3) Pressure-Sensitive Electrically Conductive Layer: A composition composed of an addition type silicone rubber compounded with tin oxideantimony oxide series conductive particles was coated at a thickness shown in each example.

(4) Pressure-Sensitive Electrically Conductive Pattern: The composition as in (3) was coated as the pattern form in each example.

(5) Electrically Insulating Pattern: A composition composed of the addition type silicone rubber as used in (3) without containing the conductive particles and having a volume resistivity of $1 \times 10^{15}$ $\Omega cm$ was coated in the pattern form described in each comparison example.

The examples of this invention and the comparison examples are described below based on FIG. 1 (A) to (H) and FIG. 10 (a) to (e), wherein each contact electrode is formed on the insulating base plate described above but the base plate is omitted in the drawings.

EXAMPLE

Pressure-sensitive electrically conductive elements (A) to (H) of this invention having the structures shown in FIG. 1 (A) to (H) were prepared. The resistance of the elements to each pressure applied was measured and the results obtained are shown in FIG. 2 to FIG. 9.

ELEMENT (A)

As shown in FIG. 1 (A), the element has one pressure-sensitive electrically conductive layer 2a on a contact electrode 1a and two stripe-form pressure-sensitive electrically conductive patterns 3a and 3b formed on the layer 2a and another contact electrode 1b, respectively. In this embodiment, the two stripe-form patterns are disposed such that they are in a crossing relation with each other at a right angle.

ELEMENT (B)

As shown in FIG. 1 (B), the element has one pressure-sensitive electrically conductive layer 2a on a contact electrode 1a and a stripe-form pressure-sensitive electrically conductive pattern 3b on another contact electrode 1b facing the contact electrode 1a.

ELEMENT (C)

As shown in FIG. 1 (C), the element has two pressure-sensitive electrically conductive layers 2a and 2b on contact electrodes 1a and 1b, respectively and a stripe-form pressure-sensitive electrically conductive pattern 3a on the layer 2a.

ELEMENT (D)

As shown in FIG. 1 (D), the element has two pressure-sensitive electrically conductive layers 2a and 2b on contact electrodes 1a and 1b, respectively, and two stripe-form pressure-sensitive electrically conductive patterns 3a and 3b on the layers 2a and 2b, respectively. The two patterns are disposed such that they are in a crossing relation with each other at a right angle.

ELEMENT (E)

As shown in FIG. 1 (E), the element has one pressure-sensitive electrically conductive layer 2a on a contact electrode 1a and a lattice-form pressure-sensitive electrically conductive pattern 4 on another contact electrode 1b facing the contact electrode 1a.

ELEMENT (F)

As shown in FIG. 1 (F), the element has two pressure-sensitive electrically conductive layers 2a and 2b on contact electrodes 1a and 1b, respectively, and a lattice-form pressure-sensitive electrically conductive pattern 4 on the contact electrode 1b.

ELEMENT (G)

As shown in FIG. 1 (G), the element has one pressure-sensitive electrically conductive layer 2a on a contact electrode 1a and a dot-form pressure-sensitive electrically conductive pattern 5 on another contact electrode 1b facing the contact electrode 1a.

ELEMENT (H)

As shown in FIG. 1 (H), the element has two pressure-sensitive electrically conductive layers 2a and 2b on contact electrodes 1a and 1b, respectively, and a dot-form pressure-sensitive electrically conductive pattern 5 on the layer 2b.

In the stripe-form pressure-sensitive electrically conductive patterns in the above examples, the line width was 0.5 mm and the distance between the lines was 1.5 mm. In the lattice-form patterns, the line width was 0.5 mm and the distance between the lines was 2.0 mm. In the dot-form patterns, the diameter was 0.5 mm and the distance between the dots was 2.5 mm. In each case, the thickness of the pattern was 30 $\mu m$. Also, the pressure-sensitive electrically conductive layer formed on the whole surface of the contact electrode had a thickness of 30 $\mu m$ in each case.

Figure 2:
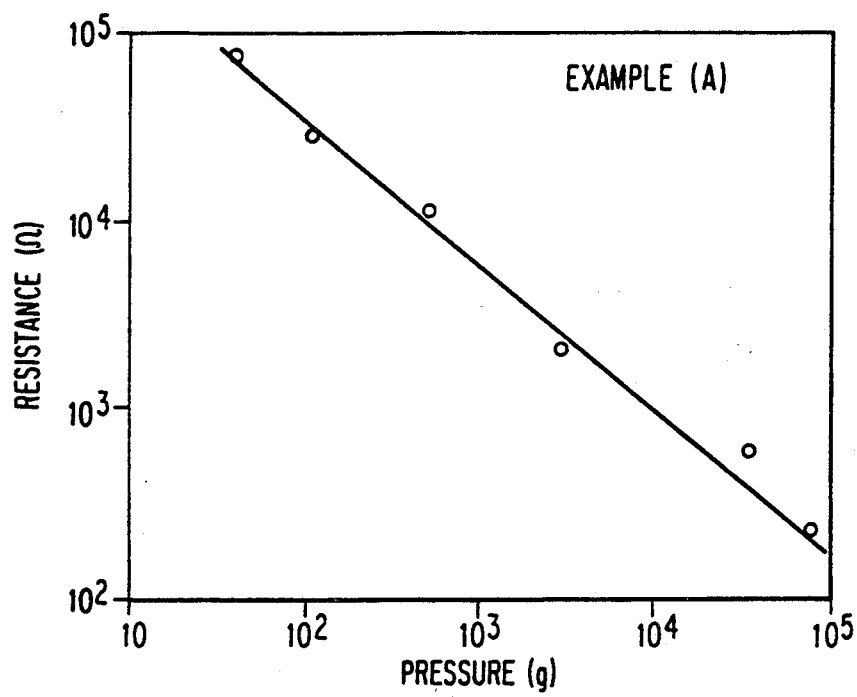
Figure 3:
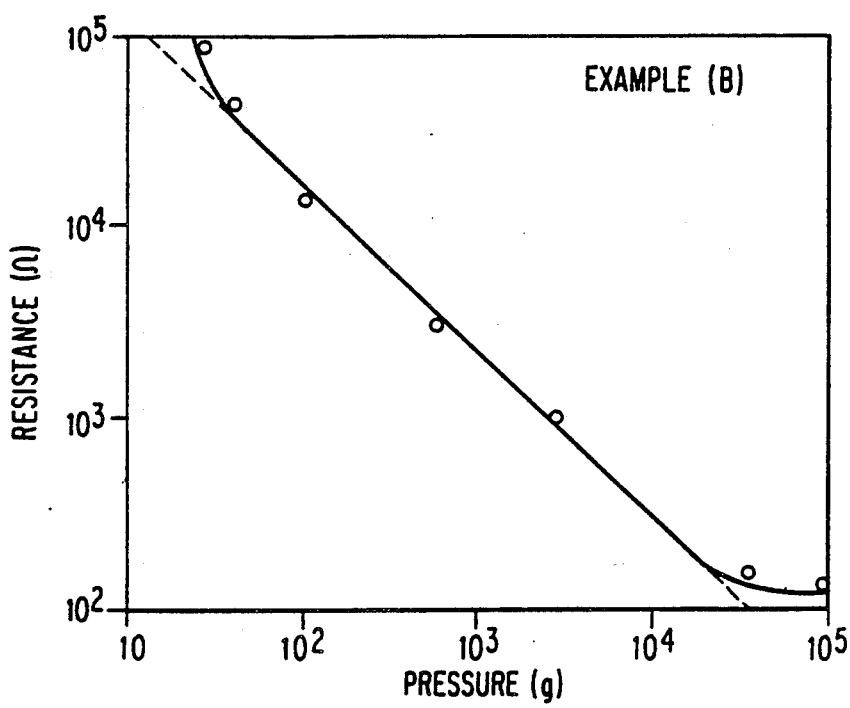
Figure 4:
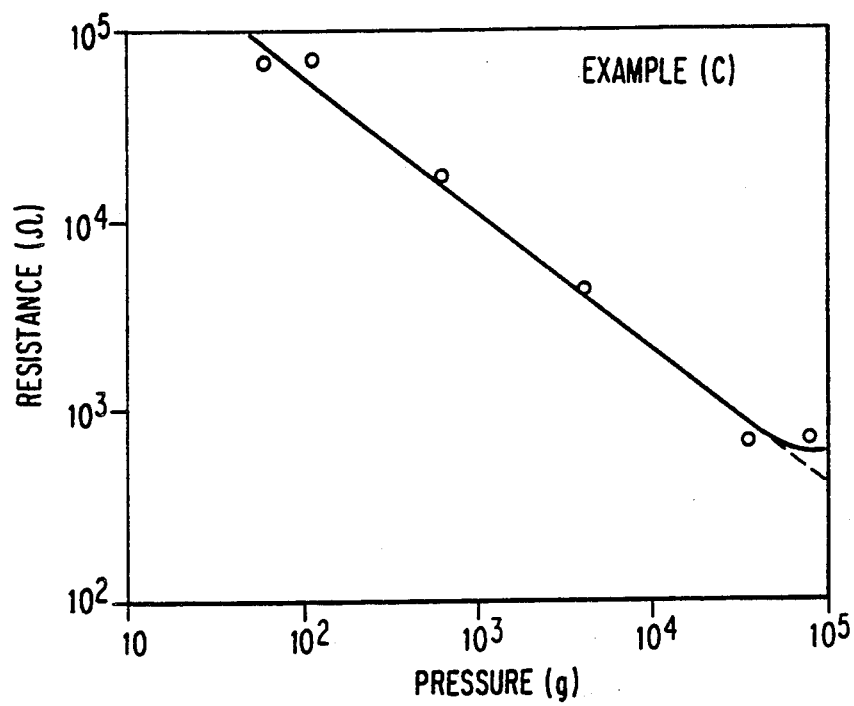
Figure 5:
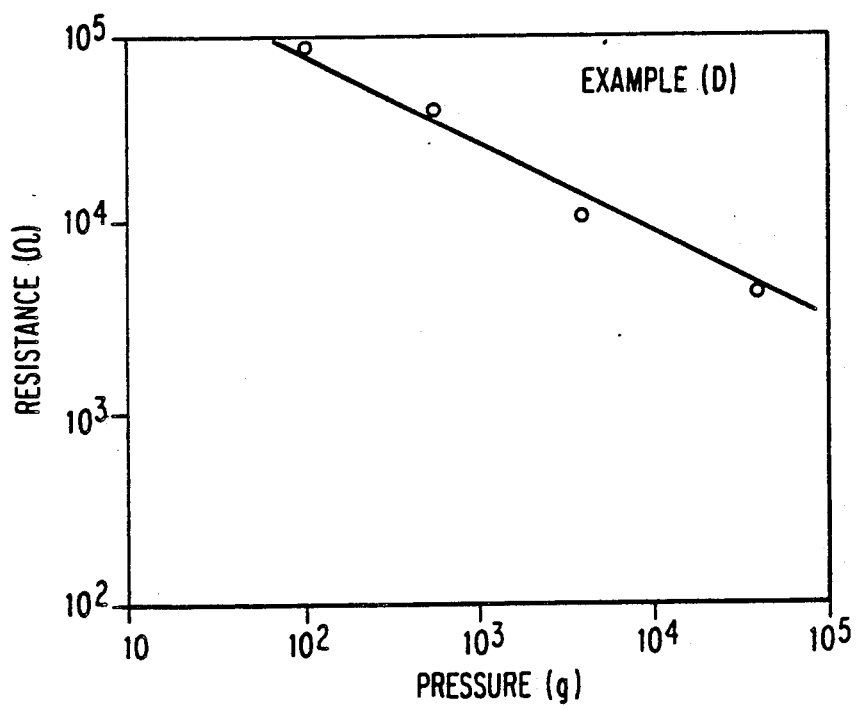
Figure 6:
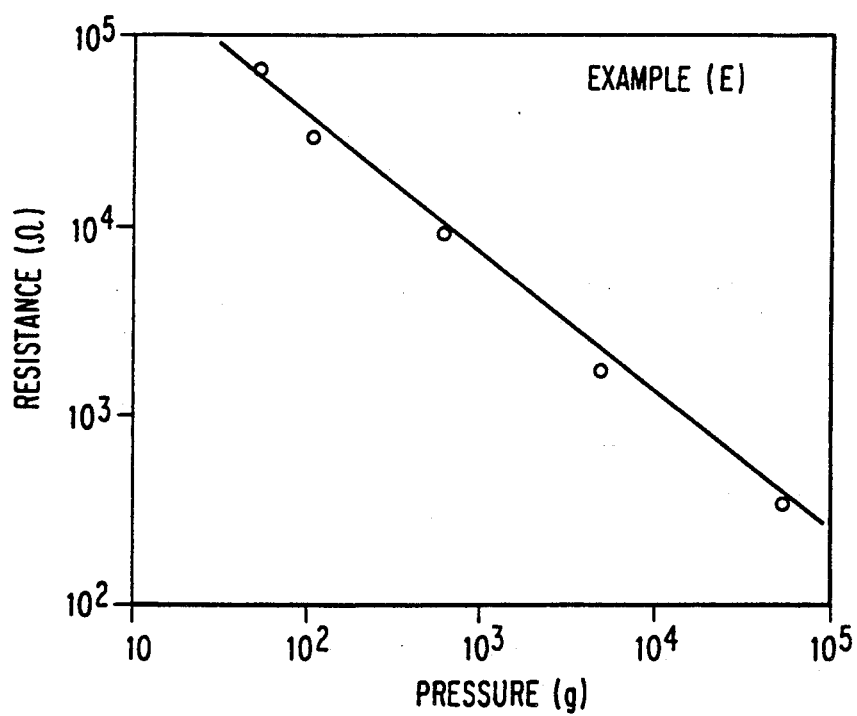
Figure 7:
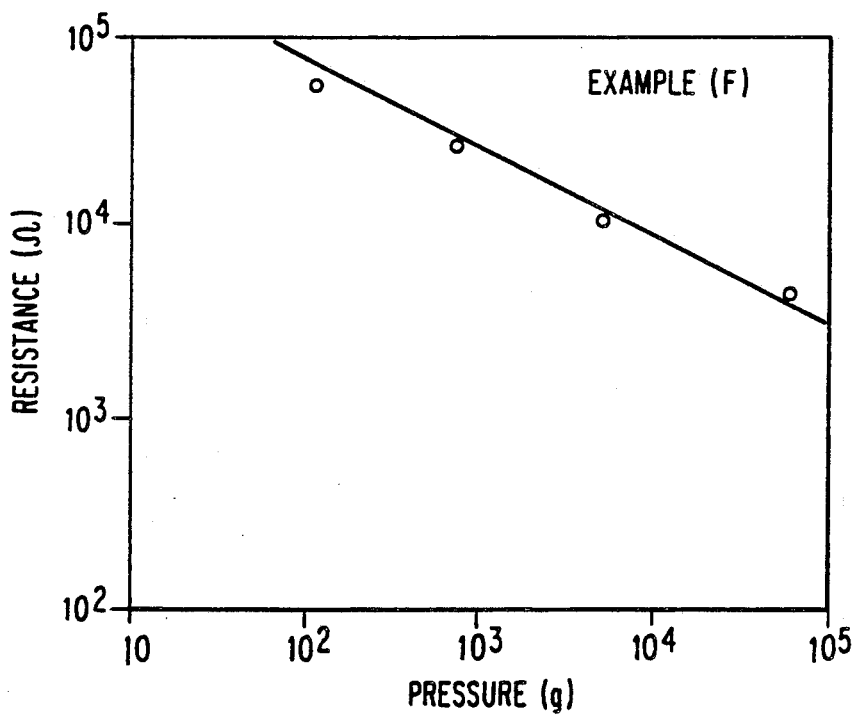
Figure 8:
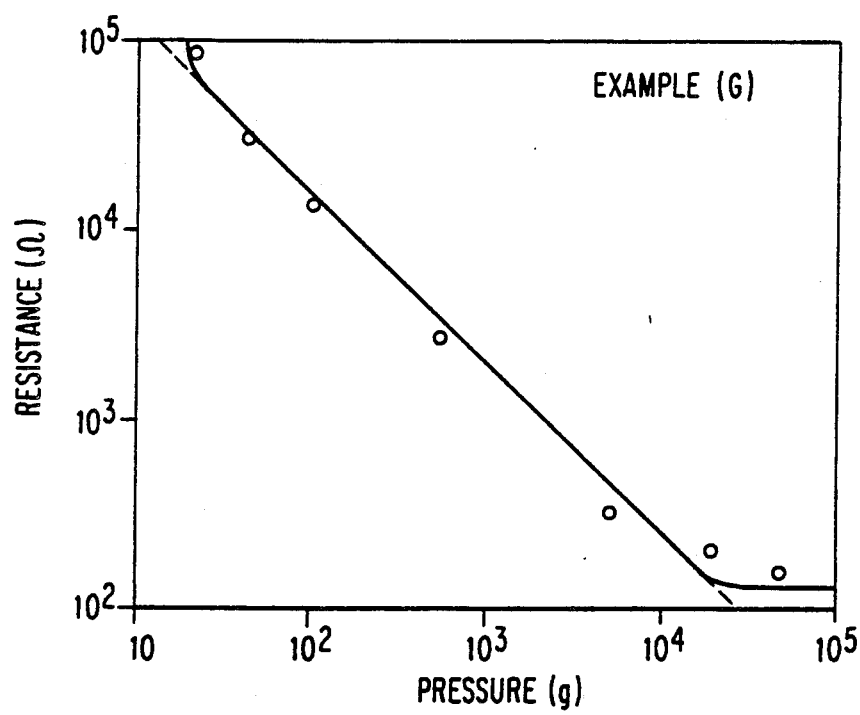
Figure 9:
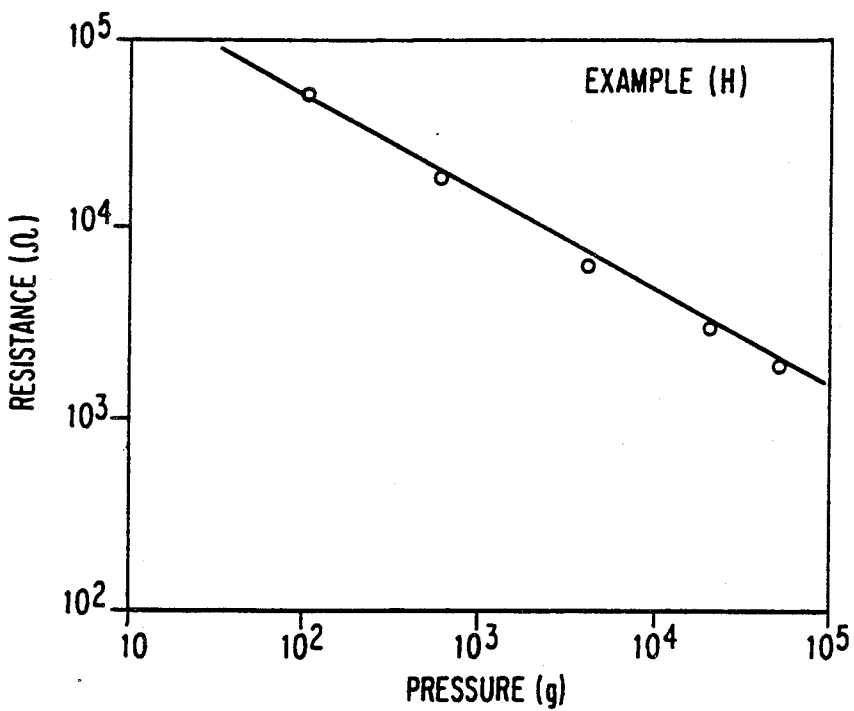
Figure 10A:
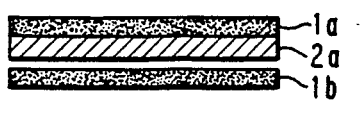
Figure 10B:
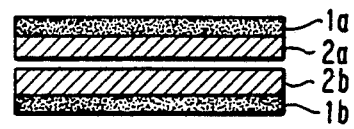
Figure 10C:
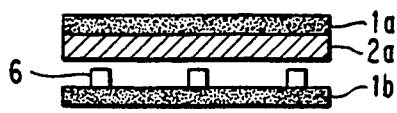
Figure 10D:
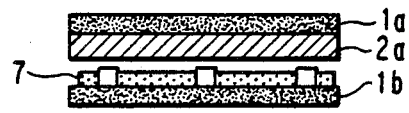
Figure 10E:
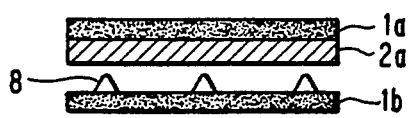
Figure 11:
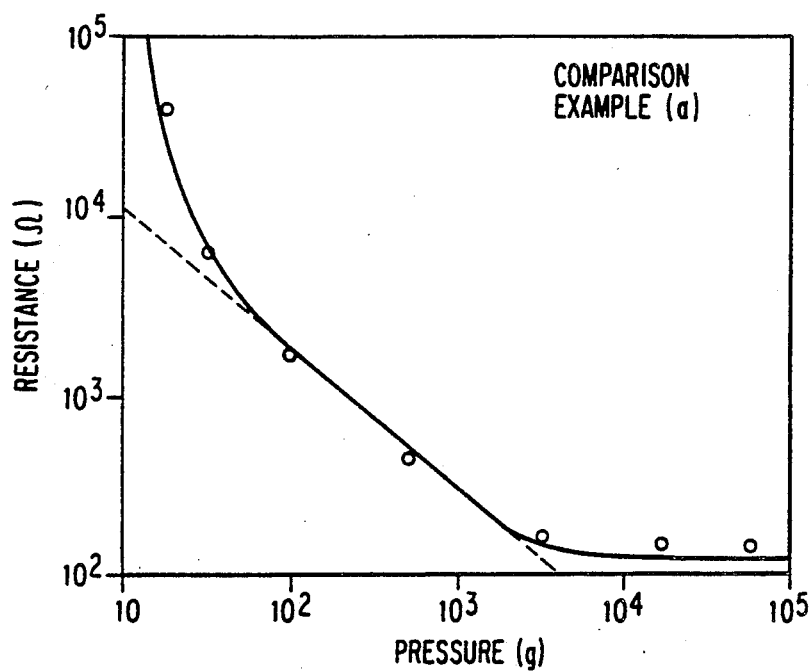
Figure 12:
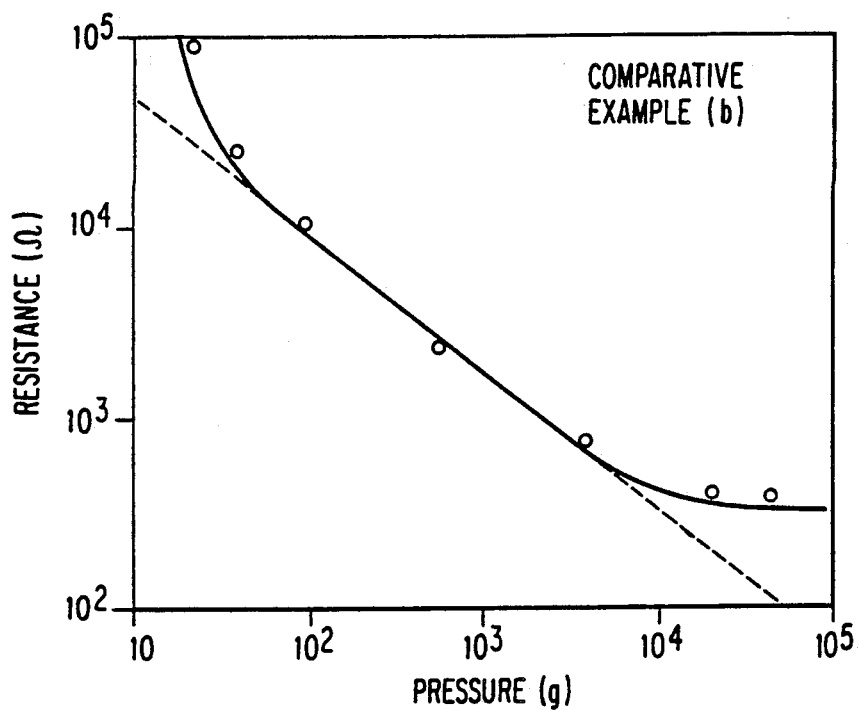
Figure 13:
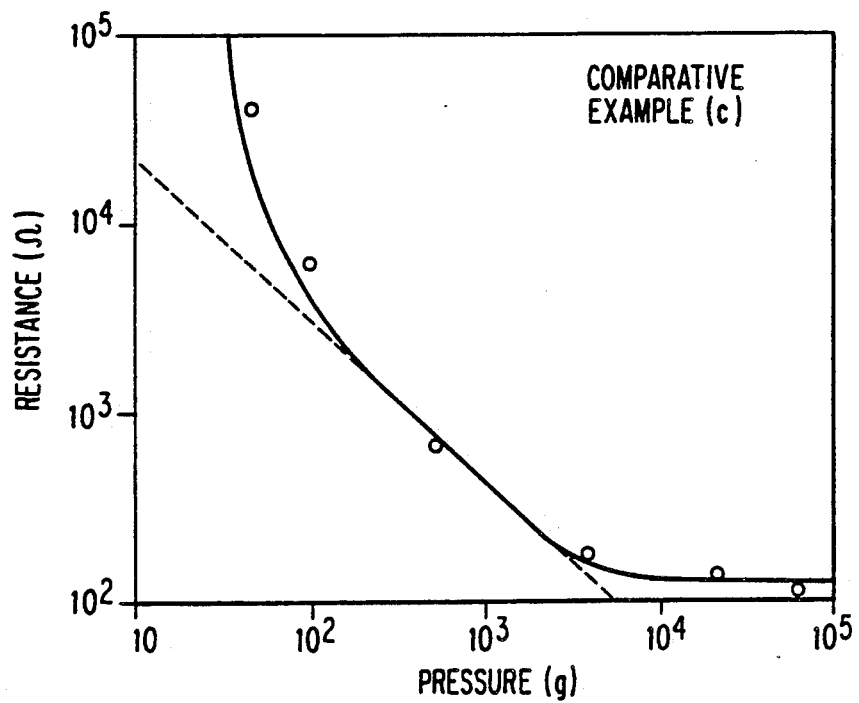
Figure 14:
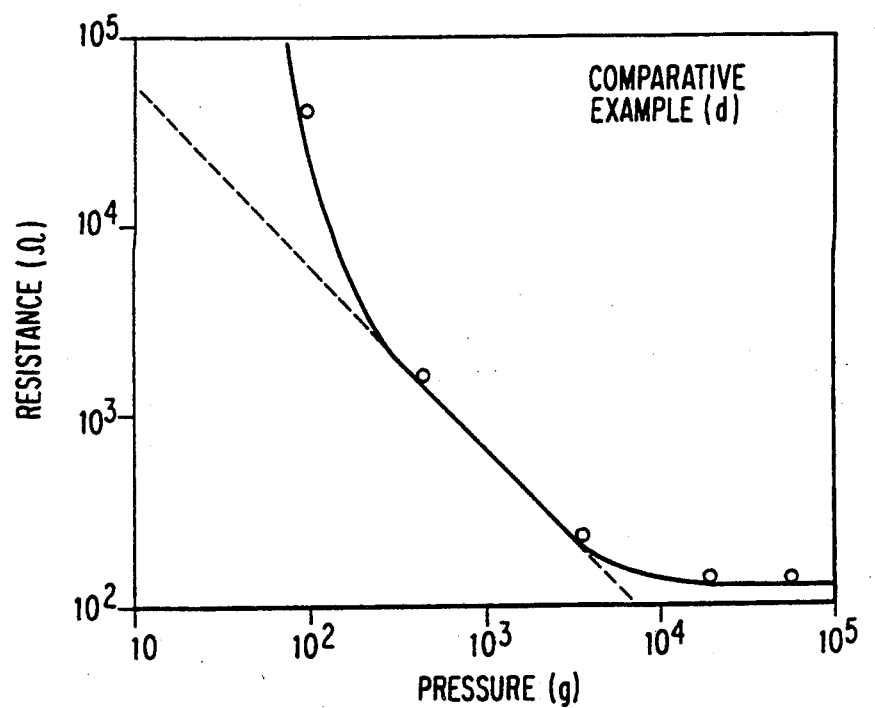
Figure 15:
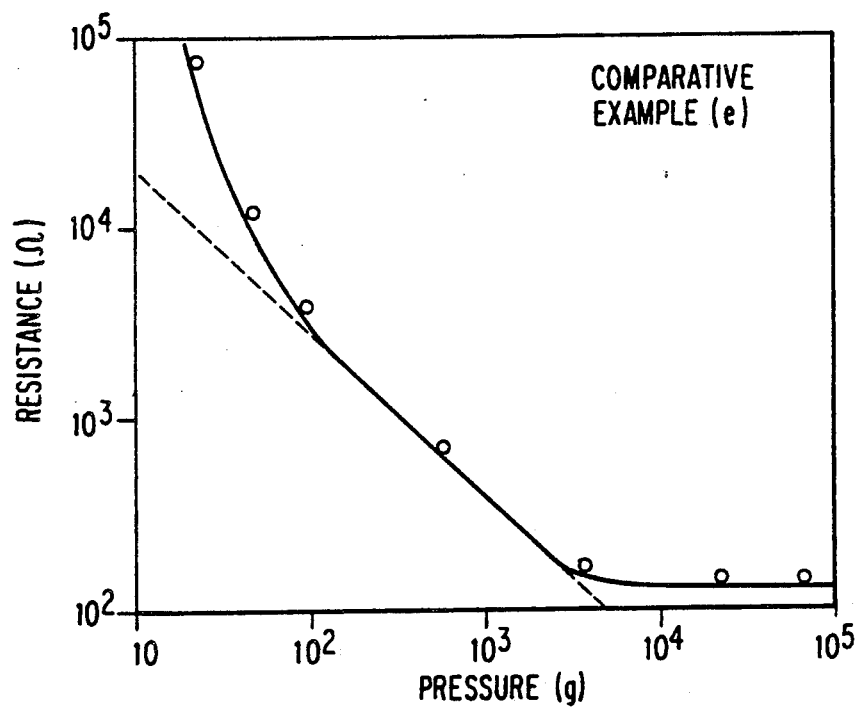

FIG. 2 and FIG. 9 are graphs showing the change of the resistance of the elements A to H, respectively, with the applied pressure.

As shown in FIG. 2 to FIG. 9, the pressure range showing a linear pressure-resistance relation is very wide as from several tens grams to 100 kg in each element of this invention and the change range of the resistance is very wide in each element.

COMPARISON EXAMPLE

Comparison pressure-sensitive electrically conductive elements (a) to (e) shown in FIG. 10 (a) to (e) were prepared and the change of the resistance to a pressure applied was measured as in the above example. The results obtained are shown in FIG. 11 to FIG. 15.

ELEMENT (a)

As shown in FIG. 10 (a), the element has only one pressure-sensitive electrically conductive layer 2a between contact electrodes 1a and 1b.

ELEMENT (b)

As shown in FIG. 10 (b), the element has two pressure-sensitive electrically conductive layers 2a and 2b formed on contact electrides 1a and 1b, respectively.

ELEMENT (c)

As shown in FIG. 10 (c), the element has one pressure-sensitive electrically conductive layer 2a on a contact electrode 1a and a stripe-form electrically insulating pattern 6 is formed on another contact electrode 1b facing the contact electrode 1a.

ELEMENT (d)

As shown in FIG. 10 (d), the element has one pressure-sensitive electrically conductive layer 2a on a contact electrode 1a and a lattice-form electrically insulating pattern 7 on another contact electrode 1b facing the contact electrode 1a.

ELEMENT (e)

As shown in FIG. 10 (e), the element has one pressure-sensitive electrically conductive layer 2a on a contact electrode 1a and a dot-form electrically insulating pattern 8 on another contact electrode 1b facing the contact electrode 1a.

FIG. 11 to FIG. 15 are graphs showing the change of the resistance of the comparison elements (a) to (e), respectively, by the applied pressure.

As shown in FIG. 11 to FIG. 15, the applying pressure range showing a linear pressure-resistance relation is clearly narrow in each comparison element and also the change range of the resistance is narrow.

While the invention has been described in detail and with reference to specific embodiments thereof, it will be apparent to one skilled in the art that various changes and modifications can be made therein without departing from the spirit and scope thereof.

What is claimed is:

1. A pressure-sensitive resistance element comprising a first contact electrode formed on a first electrically insulating base plate, a second contact electrode formed on a second electrically insulating base plate disposed facing the first contact electrode, a pressure-sensitive electrically conductive layer formed on the whole surface of at least one of the first and second contact electrode regions, and a pressure-sensitive electrically conductive pattern formed on at least one of the pressure-sensitive electrically conductive layers or the pressure-sensitive electrically conductive layer and the contact electrode having no pressure-sensitive electrically conductive layer thereon.

2. The pressure-sensitive resistance element as claimed in claim 1, wherein the form of the pressure-sensitive electrically conductive pattern is a stripe, lattice or dot.

3. The pressure-sensitive resistance element as claimed in claim 1, wherein a stripe-form pressure-sensitive electrically conductive pattern is formed on the first contact electrode or the first pressure-sensitive electrically conductive layer and a stripe-form pressure-sensitive electrically conductive pattern is formed on the second contact electrode or the second pressure-sensitive electrically conductive layer, said patterns being disposed such that they are in a crossing relation with each other at a right angle.

4. The pressure-sensitive resistance element as claimed in claim 1, wherein the form of the pressure-sensitive electrically conductive pattern is a plurality of stripes.

5. The pressure-sensitive resistance element as claimed in claim 4, wherein said stripes have a line width of from 0.05 mm to 3 mm, the distance between the stripes is from 0.1 mm to 50 mm and the thickness of the stripes if from 5 $\mu$m to 100 $\mu$m.

6. The pressure-sensitive resistance element as claimed in claim 1, wherein the form of the pressure-sensitive electrically conductive pattern is a plurality of dots.

7. The pressure-sensitive resistance element as claimed in claim 6, wherein the diameter of the dots is from 0.05 mm to 3 mm, the distance between dots is from 0.1 mm to 50 mm and the thickness of the dots is from 5 $\mu$m to 100 $\mu$m.

8. The pressure-sensitive resistance element as claimed in claim 1, wherein the form of the pressure-sensitive electrically conductive pattern is a lattice.

9. The pressure-sensitive resistance element as claimed in claim 8, wherein the lattice has a line width of from 0.05 mm to 3 mm, the distance between lattice lines is from 0.1 mm to 50 mm and the thickness of the lattice is from 5 $\mu$m to 100 $\mu$m.

10. The pressure-sensitive resistance element as claimed in claim 1, wherein the first contact electrode ha a pressure-sensitive electrically conductive layer which as a stripe-form pressure-sensitive electrically conductive pattern thereon and the second contact electrode has a stripe-form electrically conductive pattern thereon, which stripe-form electrically conductive patterns are disposed such that they are in a crossing relation with each other at a right angle.

11. The pressure-sensitive resistance element as claimed in claim 1, wherein the first contact electrode has one pressure-sensitive electrically conductive layer thereon without a pressure-sensitive electrically conductive pattern and the second contact electrode has a stripe-form pressure-sensitive electrically conductive pattern thereon.

12. The pressure-sensitive resistance element as claimed in claim 1, wherein the first contact electrode has a pressure-sensitive electrically conductive layer thereon without a pressure-sensitive electrically conductive pattern thereon and the second contact electrode has a lattice-form pressure-sensitive electrically conductive pattern thereon.

13. The pressure-sensitive resistance element as claimed in claim 1, wherein the first contact electrode has a pressure-sensitive electrically conductive layer thereon without a pressure-sensitive electrically conductive pattern thereon and the second contact electrode has a dot-form pressure-sensitive electrically conductive pattern thereon.

* * * * *